United States Patent
Blanc

(10) Patent No.: US 7,125,154 B2
(45) Date of Patent: Oct. 24, 2006

(54) BACKLIGHTING APPARATUS

(75) Inventor: Christophe Blanc, Lourmarin (FR)

(73) Assignee: PHLOX, Aix les Milles Cedex (FR)

( * ) Notice: Subject to any disclaimer, the term of this patent is extended or adjusted under 35 U.S.C. 154(b) by 24 days.

(21) Appl. No.: 10/510,134

(22) PCT Filed: Apr. 4, 2003

(86) PCT No.: PCT/FR03/01060

§ 371 (c)(1),
(2), (4) Date: Oct. 4, 2004

(87) PCT Pub. No.: WO03/085428

PCT Pub. Date: Oct. 16, 2003

(65) Prior Publication Data

US 2005/0174804 A1    Aug. 11, 2005

(30) Foreign Application Priority Data

Apr. 5, 2002 (FR) .................................. 02 04258

(51) Int. Cl.
*F21V 7/04* (2006.01)

(52) U.S. Cl. .................. 362/620; 362/613; 362/626

(58) Field of Classification Search ................ 362/613, 362/619, 620, 625, 626, 606, 617, 623, 558; 385/146, 901

See application file for complete search history.

(56) References Cited

U.S. PATENT DOCUMENTS

| | | | |
|---|---|---|---|
| 5,450,292 A | | 9/1995 | Yokoyama et al. |
| 5,667,289 A | * | 9/1997 | Akahane et al. ............. 362/614 |
| 5,854,872 A | * | 12/1998 | Tai .............................. 385/133 |
| 5,999,685 A | | 12/1999 | Katsutoshi et al. |
| 6,036,328 A | | 3/2000 | Hiroshi et al. |
| 6,123,431 A | * | 9/2000 | Teragaki et al. ............. 362/625 |
| 6,275,339 B1 | | 8/2001 | Chazallet et al. |
| 6,330,386 B1 | * | 12/2001 | Wagner et al. ............... 385/120 |
| 6,467,922 B1 | | 10/2002 | Blanc et al. |
| 6,508,564 B1 | * | 1/2003 | Kuwabara et al. .......... 362/612 |
| 6,631,998 B1 | * | 10/2003 | Egawa et al. ................ 362/612 |
| 2001/0019379 A1 | * | 9/2001 | Ishihara et al. ............... 349/65 |

* cited by examiner

*Primary Examiner*—Renee Luebke
*Assistant Examiner*—Gunyoung T. Lee
(74) *Attorney, Agent, or Firm*—Young & Thompson

(57) ABSTRACT

Disclosed is a lightguide in the form of a plate (1), a first surface of which is provided with first straight parallel grooves (8) (diffusing the light circulating in the guide). The inventive lightguide is characterized by the fact that it is provided with second straight parallel grooves (9) (diffusing the light circulating in the guide) which extend in an oblique direction, particularly in an orthogonal direction, relative to the first grooves such that the guide diffuses in a uniform manner the light that is introduced into the guide via three or four edges thereof.

16 Claims, 7 Drawing Sheets

⇨ = source led

BACKLIGHTING APPARATUS

BACKGROUND OF THE INVENTION

The present invention relates to lightguides used for backlighting or lighting, which are produced by laser machining.

The invention relates more specifically to lightguides in the form of thin, generally planar sheets consisting of a translucent or transparent material, particularly glass, polycarbonate or methyl polymethacrylate.

Such guides are part of the constitution of luminous displays such as signboards or signal devices; in the constitution of display units of computers and the like electronic devices, particularly for the backlighting of liquid crystal screens and the lighting of objects, particularly for visualization of the object by a camera for automated control of the object's properties.

BRIEF DESCRIPTION OF THE RELATED ART

The document WO-9815862 describes a device for collimating and deflecting the light emitted by two diodes toward the edge of a planar backlighting guide; the device comprises a prism and rows of microprisms or microgrooves extending approximately along the average direction of propagation in the prism and guiding the light by reflection and refraction.

The document U.S. Pat. No. 5,999,685 describes a planar backlighting guide manufactured by molding resin in a metallic mold; each of its two faces (front and rear) comprises a series of portions of parallel isosceles-triangular prisms with vertices of ca 150 degrees; the edges of the prisms of one face extend perpendicular to the edges of the prisms of the other face; these prisms deflect the light by refraction and reflection.

Further, it is known from the documents EP-945674 and EP-1107048 to machine linear diffusing patterns with regularly variable spacing using a laser beam.

Such guides are illuminated by sources positioned along one or two generally opposing edges, thereby limiting the maximum light flux that can be re-emitted onto the main surface of the guide.

The document EP-561329 describes a luminous device comprising a rectangular guide illuminated along its four sides or edges by cold cathode fluorescent tubes; the device comprises a planar diffuser covering the emitting face (front face) of the rectangular guide and a reflector covering the rear face of this guide; printed on this rear face are miniscule rough surfaces arranged according to different patterns, depending on whether the thickness of the guide is uniform or variable.

SUMMARY OF THE INVENTION

The purpose of the invention is to propose an improved lightguide.

One objective of the invention is to propose lightguides in the form of a thin plate and lighting devices incorporating such guides illuminated at their edges, in order to remedy, at least in part, the drawbacks of known guides and lighting devices.

To this end, and according to a first aspect, one of the faces of the guide comprises a network of irregular and/or rough linear diffusing patterns that are formed in the material of the guide and crisscross each other.

Each linear diffusing pattern (extending rectilinearly or curvilinearly) is generally constituted of a depression or groove (referred to as central) with a depth in the range of 1–70 microns, and more specifically, 10–30 microns, and a width lying in the range of 10–150 microns, particularly, in the vicinity of 20–60 microns, and an irregular and/or variable profile (transverse) along the longitudinal axis of the groove.

Each depression forms a channel along each of whose edges extends a zone (or lateral strip) of irregularly formed projections and depressions whose width is close to (and generally equal to, at most) half that of the central depression and generally smaller than this half.

Preferably, the average width of a diffusing pattern (composed of said depression or groove and the two lateral strips) is greater than 40 microns and less than 200 microns, and in particular, ranges from 50 to 120 microns.

These linear patterns are obtained by laser-machining the plate of the guide, similarly to the process described in the document EP 1107048.

Such guides have been found to have distinctly improved performance; it seems likely that using a laser beam to form an irregular groove intersecting with another irregular groove preformed on the same face of the guide to form additional irregular roughness at the intersection between these two grooves enhances the diffusing characteristics of these patterns and the optical efficiency of the guide to such an extent that it obviates the use of an additional guide to collimate and/or concentrate the light emitted by a source toward the end of the planar guide.

In a second aspect, the two opposing main faces (of larger size) of the guide each comprise a pattern of irregular linear diffusing patterns, with the patterns of a first network being oblique (perpendicular when the guide has this shape) to the patterns of a second network (hence, virtually crisscrossing as seen from above).

These diffusing patterns have the same characteristics as those described above; light diffusing performance essentially equivalent to that obtained with crisscrossing grooves on only one side of the guide were observed.

Particularly satisfactory results were obtained with PMMA guides with thicknesses of ca 1–2 millimeters illuminated along their four edges by four series of CMS type light-emitting diodes (LED) of single-piece construction with a printed circuit surrounding the guide.

The space between two successive patterns of one of the two networks of parallel patterns (parallel to the end of the guide and/or to the light source) varies substantially regularly and in a non-monotonic manner. Thus, the distance between two adjacent segments or diffusing patterns decreases on going away from an edge in which the light is injected, then increases on approaching the opposing light-injection edge.

Because the two networks intersect, they form a grid whose geometric designs (mesh) have an area that decreases substantially regularly and monotonically as the center of the lightguide is approached.

In another aspect, the invention proposes a surface lighting apparatus, particularly a backlighting apparatus, which comprises:

a lightguide comprising a plate comprising two opposite edges and at least one face of which has diffusing patterns of irregular shape provided in the plate, two light sources arranged along the two opposed side edges of the plate, and the apparatus comprises in addition at least one third light source arranged along a third side edge of the plate.

According to preferred embodiments of the invention:

The diffusing patterns comprise crisscrossing grooves;

The grooves extend in two substantially orthogonal directions (Ox, Oy) so as to form a network of diffusing patterns with rectangular meshes;

The plate is rectangular and comprises four opposed side edges which are parallel two by two, with the apparatus comprising four light sources arranged along the four respective side edges of the plate;

The light sources have different visible emission colors or spectra;

The sources are white CMS LEDs (light-emitting diodes), although in some applications, CCFLs (cold cathode fluorescent lamps) can be used;

Each diffusing pattern comprises a rectilinear groove or depression and projections extending along each groove or depression, on both sides of the groove or depression.

In another aspect, the invention proposes a lightguide comprising a plate having two parallel faces and two opposed parallel side edges, with a first face comprising a plurality of first diffusing patterns, wherein the lightguide comprises second diffusing patterns crisscrossing the first diffusing patterns, that is, extending along a second oblique direction relative to the first direction in which the first patterns extend.

According to preferred embodiments of the guide:

The guide comprises a first plurality of first rectilinear diffusing patterns that are parallel with each other and have a spacing between each other that varies monotonically or not depending essentially on a first geometric progression, and a second plurality of second rectilinear diffusing patterns that are parallel with each other and whose spacing varies monotonically or not according to a second geometric progression, with said first diffusing patterns extending in a first direction that is oblique, preferably orthogonal, to the direction of the second diffusing patterns;

the first diffusing patterns and second diffusing patterns extend over the first face of the plate;

the second diffusing patterns extend over a second face of the plate which is distinct from the first face and parallel with it;

these diffusing patterns comprise a central depression and peripheral projections arranged on both sides of said depression;

the central depression is in the form of a groove having a depth in the range of 10–30 microns;

the central groove is of an average width ranging from 20 to 60 microns and the average width of the diffusing patterns being in the range of 50–120 microns;

the diffusing patterns form a grid and the form generated by this grid (meshes) diminishes essentially regularly and monotonically on approaching the center of the guide.

In another aspect, the invention proposes a process for manufacturing a lightguide in the form of a plate one face of which comprises a plurality of diffusing patterns produced with a laser beam, wherein said face is exposed to radiation having an intensity lying in a range from $10^4$ to $10^7$ w/cm² so as to form irregularities in surface area and depth and so that each of said patterns comprises a central depression and peripheral projections arranged on both sides of said central depression; the material used is chosen from among glass, polycarbonate and methyl polymethacrylate; a first network of first essentially parallel diffusing patterns is formed first, followed by a second network of essentially parallel diffusing patterns that extend obliquely, preferably essentially orthogonally relative to the first diffusing patterns.

The inventive lightguides have been found to have excellent efficiency and to provide for excellent uniformity throughout the surface of the guide, whether the light is injected along the two opposite sides or along all four sides. It was also found that the efficiency (light emitted by the sources used to inject the light/light emitted by the guide) was identical in the case of dual or quadruple injection of light. It was also found that the inventive lightguides were particularly well suited for providing very homogeneous diffusion of the light coming from a plurality of sources (LEDs).

DESCRIPTION OF THE PREFERRED EMBODIMENTS

Other advantages and characteristics of the invention will be understood on the basis of the following description, which refers to the attached drawings, which illustrate preferred embodiments of the invention in a nonlimiting manner.

Figure 1:
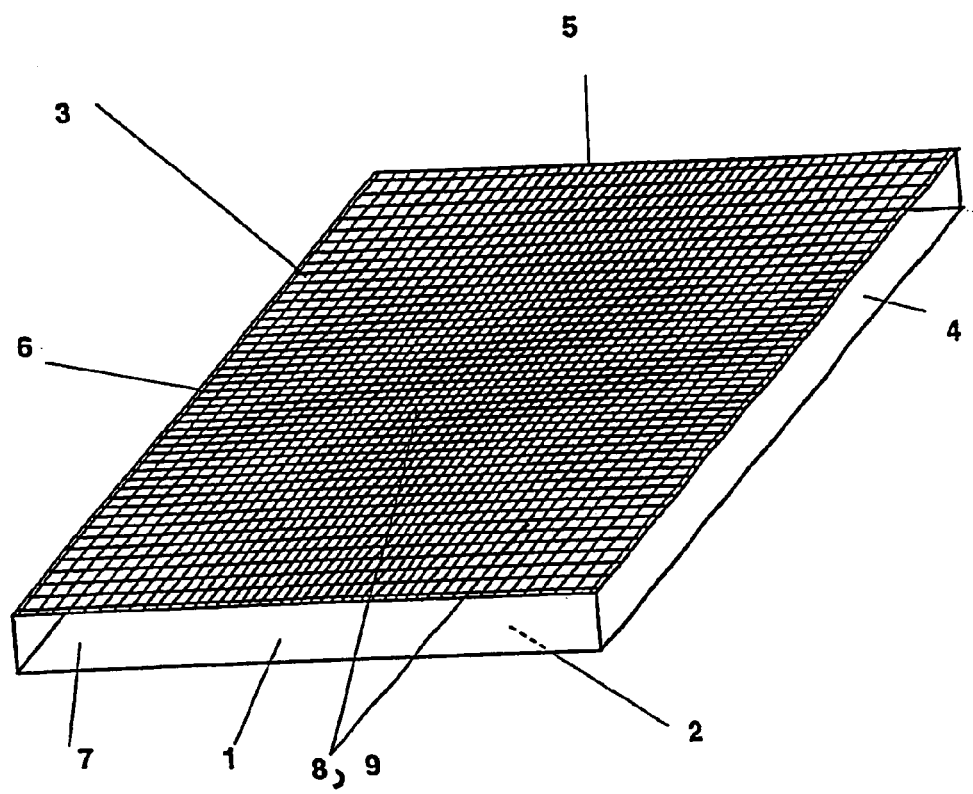
FIG. 1 is a schematic perspective view of the inventive lightguide.

FIG. 1 illustrates, in a schematic perspective view, a lightguide comprising a plate 1 having two parallel faces 2 and 3 and two opposed parallel side edges 4 and 6, with a first face 3 comprising a plurality of first diffusing patterns 8, wherein the guide comprises second diffusing patterns 9 crisscrossing first diffusing patterns. In the design (grid) formed by the crisscrossing of the two series of diffusing patterns on the same face 3, the meshes of the grid decrease in size on approaching the center.

Figure 2:
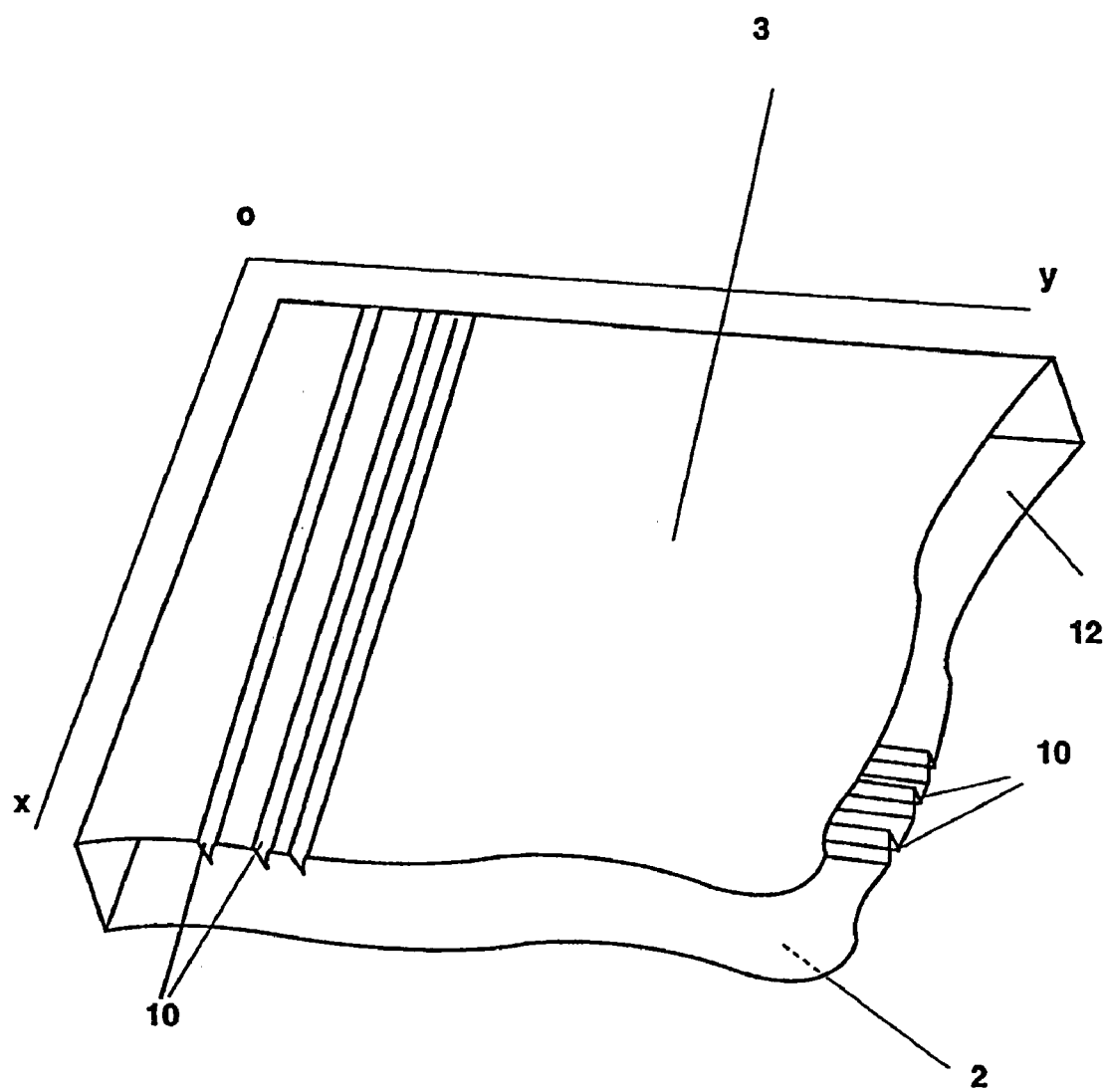
FIG. 2 is a representation of the lightguide.

FIG. 2 shows a representation of a lightguide composed of a plate 12 with two parallel faces 2 and 3. On face 3, the diffusing patterns in the form of a groove 10 are oriented according to an axis ox. On face 2, the diffusing patterns in the form of a groove 10 are oriented according to an axis oy.

Figure 3:
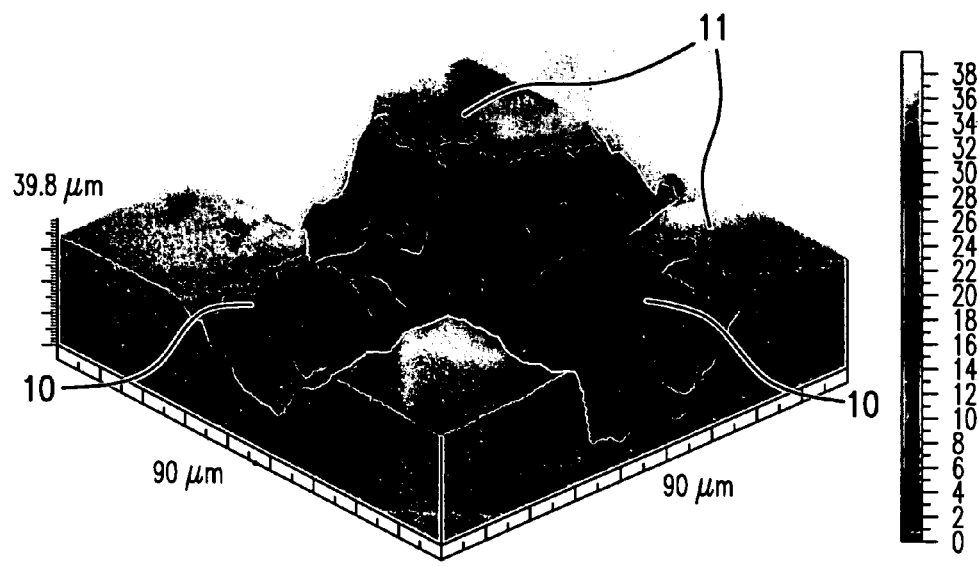
FIGS. 3–4 FIG. 4 are a three-dimensional view of the crisscrossing of two diffusing patterns.
Figure 4:
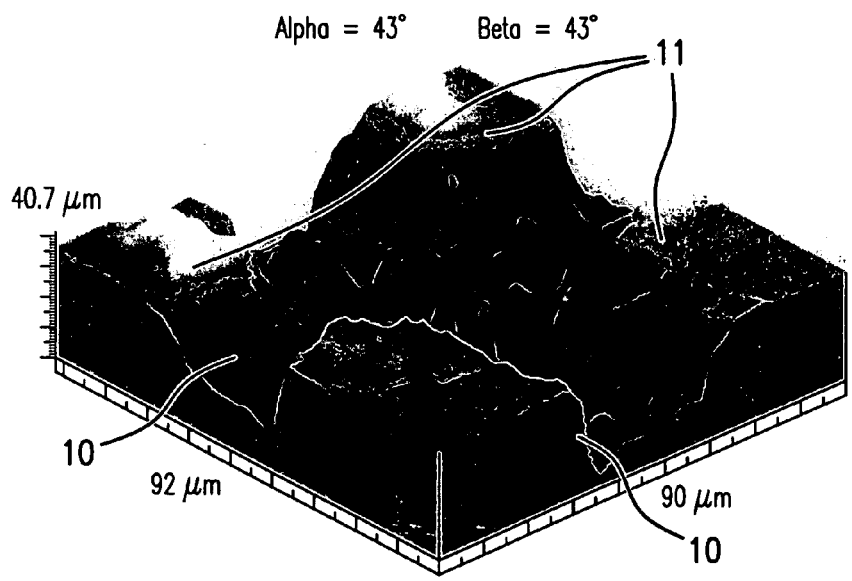

FIG. 3 and FIG. 4 represent a three-dimensional view of the crisscrossing of two diffusing patterns with the central groove 10 and the projections 11 following along this central groove. In FIG. 3 in particular, we see the heterogeneous and partially occluded nature of some grooves. Despite this fact, we see that the lightguide retains its complete efficiency.

Figure 5:
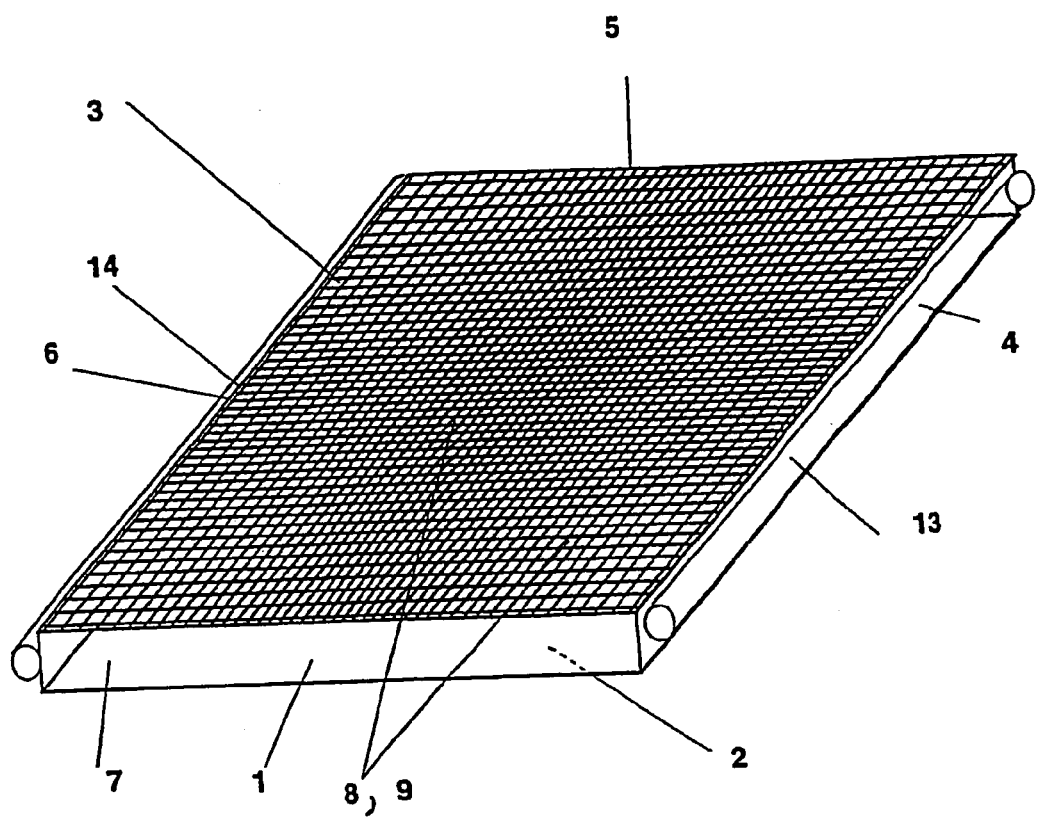
FIG. 5 is another representation the lightguide.

FIG. 5 illustrates a lightguide composed of a plate 1 on which the first diffusing patterns 8 and the second diffusing patterns 9 extend over the first face 3. Light is injected from sources 13 and 14 onto its opposed faces 4 and 6. It was found that the uniformity was equivalent at all points during the use of sources at the four side edges 4, 5, 6, 7.

Figure 6:
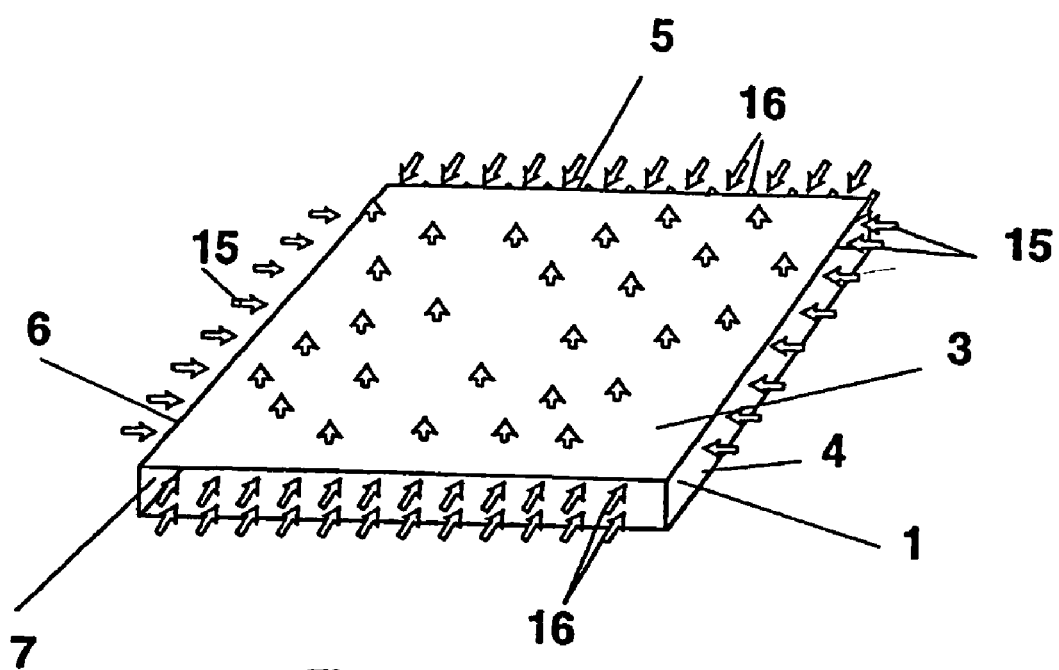
FIG. 6 shows light sources acting on the surface of the lightguide.

FIG. 6 shows that it is possible to use sources of different intensities (luminance of sources 16>luminance of sources 15) so as to change discretionarily the luminance level on the surface of the lightguide 1 while maintaining the same uniformity level. This lighting would make it possible, for example, to backlight a liquid crystal screen with:

- A "day" mode in which the four side edges 4, 5, 6, 7 are illuminated by sources 15 and 16,
- A "night" mode in which only side edges 4 and 6 are illuminated by sources 15, thereby enabling the use of amplifying binoculars for night vision.

Figure 7:
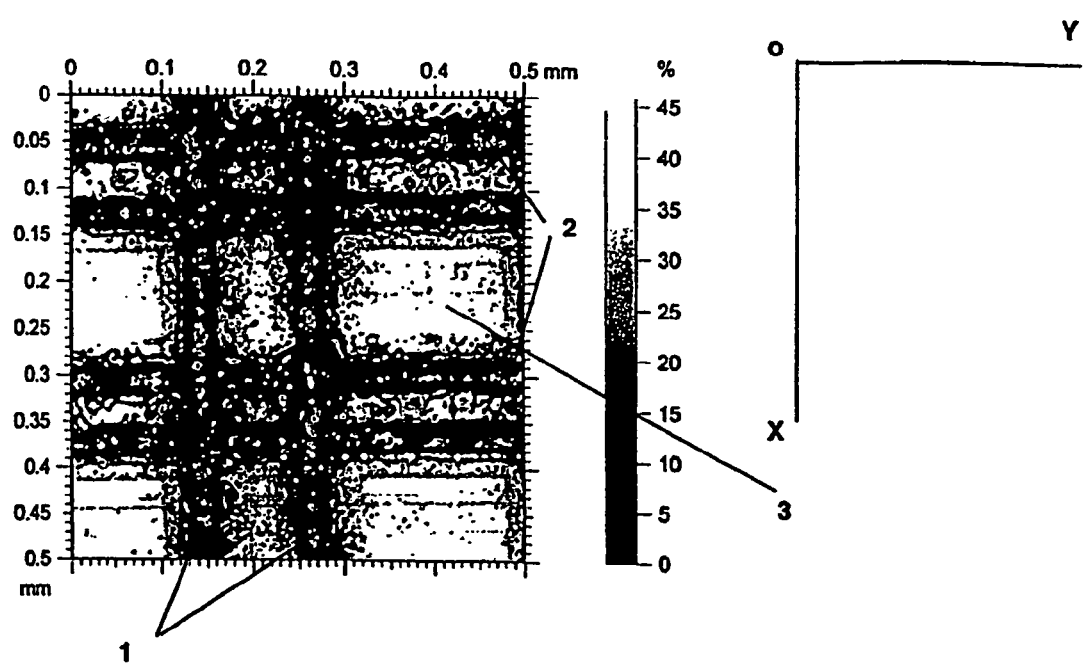
FIG. 7 is a guide portion.

FIG. 7 shows a photograph of a guide portion. On surface 3, the diffusing patterns 1 are oriented according to an OX axis and the second diffusing patterns 2 are oriented according to an OY axis. Here again, we note the heterogeneous and partially occluded character of some grooves.

Figure 8:
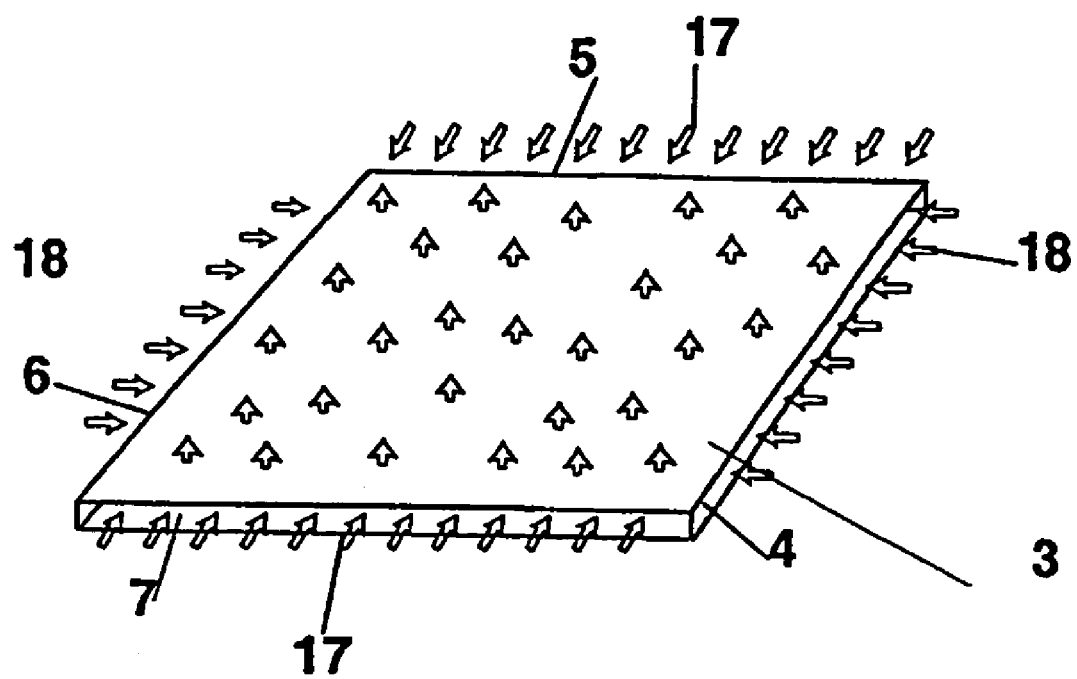
FIG. 8 also shows light sources acting on the surface of the lightguide.

FIG. 8 shows that it is also possible, using sources 17 and 18 having different wavelengths, to produce color sequencing, ie, to alternate the illumination of sources 18 on side edges 4 and 6 and the illumination of sources 17 on side edges 5 and 7, and/or to mix the two wavelengths to create a new emission spectrum at the surface 3 of guide 1 by simultaneously using sources 18 and 17 at all four side edges 4, 5, 6, 7.

The invention makes it possible to produce backlighting devices having an emitting surface ranging from 25–700 cm$^2$, a luminance ranging from 4,000 to 16,000 candelas/m$^2$, an emitted luminous flux with a uniformity over 90% and generally over 95%, a total thickness (including the mechanical support and protective structures of the LEDs) ranging from 5 to 10 mm, and with a maximum operating temperature not exceeding ambient temperature by more than 10–25 degrees Celsius.

The invention claimed is:

1. Lighting device that comprises:
   a lightguide comprising a plate (1,12), comprising at least two opposed side edges (4,6), one face (3) of which has first irregular diffusing patterns (8) formed in the plate,
   two light sources (13,14) arranged along two opposed side edges of the plate,
   at least one third light source arranged along a third side edge of the plate,
   second irregular diffusing patterns formed in the plate crosscrossing with the first diffusing patterns,
   each diffusing pattern comprising a groove (10) bordered by two strips of irregular projections and depressions,
   each diffusing pattern having irregularities in surface area and depth,
   the grooves of the first diffusing patterns being spaced apart at varying distances, and
   the grooves of the second diffusing patterns being spaced apart at varying distances.

2. Device according to claim 1, wherein the grooves extend in two essentially orthogonal directions (Ox, Oy).

3. Device according to claim 2, wherein the plate is rectangular and comprises two pairs of parallel opposed side edges, with the device comprising four light sources (13–18) arranged along the four respective side edges of the plate, where each source consists of a row of LEDs.

4. Device according to claim 1, wherein the light sources have different visible light emission colors or spectra, the light sources being LEDs (light-emitting diodes).

5. Device according to claim 1, wherein each of the sources comprises a series of LEDs of essentially white color welded to a printed circuit that surrounds the plate.

6. Device according to claim 1 wherein the face (3) has luminance at least equal to 4,000 cd/m2.

7. Device according to claim 1 wherein the face (3) has luminance in excess of 1,000 cd/m2.

8. Device according to claim 1 wherein the face (3) has luminance lying in a range from 5,000 to 20,000 cd/m2.

9. Lightguide, comprising:
   a plate (1,12) having two parallel faces (2,3) and at least two opposed side edges (4,6), with a first face (3) having a plurality of first irregular elongate diffusing patterns (8,10) formed in the plate, wherein,
   said lightguide comprises second irregular elongate diffusing patterns (9,10) formed in the plate and crisscrossing the first diffusing patterns,
   the first and second diffusing patterns comprising grooves (10) bordered by two strips of projections and depressions,
   each groove having irregularities in depth and an irregular transverse profile,
   the grooves of the first diffussion patterns being spaced apart at varying distances, and
   the grooves of the second diffusing patterns being spaced apart at vary distances.

10. Lightguide according to claim 9, comprising afirst plurality of first rectilinear diffusing patterns (8,10), parallel with each other, and a second plurality of second rectilinear diffusing patterns that are parallel with each other, with said first diffusing patterns extending in a first direction (Ox) that is oblique to the direction (Oy) of the second diffusing patterns.

11. Lightguide according to claim 9, wherein the first diffusing patterns and the second diffusing patterns extend over the first face (3) of the plate, with the plate comprising components that partially obstruct some grooves.

12. Lightguide according to claim 9, wherein the second diffusing patterns extend over a second face (2) of the plate that is distinct from and parallel to the first (3).

13. Lightguide according to claim 9, wherein the grooves have a depth lying in the range of 10–30 microns.

14. Lightguide according to claim 9, wherein each groove has an average width in the range of 20–60 microns and the average width of the diffusing patterns is in the range of 50–120 microns.

15. Lightguide according to claim 9, wherein the diffusing patterns form a grid, with the area of the meshes of the grid decreasing in size essentially regularly and monotonically on approaching the center of the guide.

16. Lightguide according to claim 9, wherein the plate material is one of glass, polycarbonate, and methyl polymethacrylate.

* * * * *